H. MULHOLLAND

Churn

No. 117446

PATENTED JUL 25 1871

Witnesses.

H. Mulholland.
Inventor
by Daniel Breed
his Attorney.

UNITED STATES PATENT OFFICE.

HENRY MULHOLLAND, OF UNION MILLS, PENNSYLVANIA, ASSIGNOR TO HIMSELF AND JOHN MULHOLLAND.

IMPROVEMENT IN CHURN-DASHERS.

Specification forming part of Letters Patent No. 117,446, dated July 25, 1871.

*To all whom it may concern:*

Be it known that I, HENRY MULHOLLAND, of Union Mills, in the county of Erie and State of Pennsylvania, have invented certain new and useful Improvements in Churns; and I hereby declare that the following is a full and clear description thereof, reference being had to the accompanying drawing and to the letters of reference marked thereon.

Figure 1:
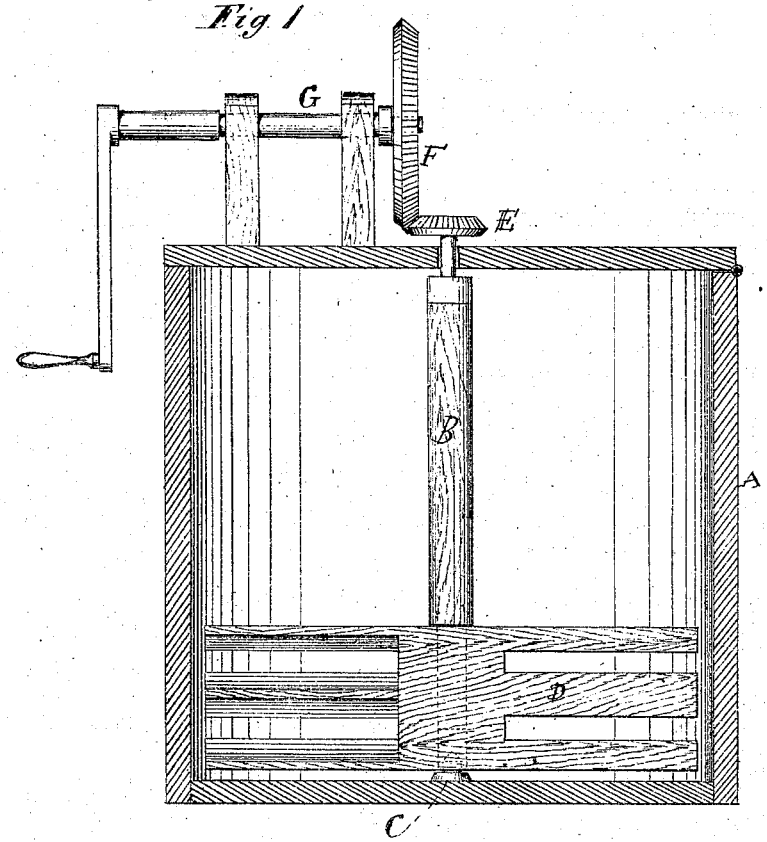
Figure 2:
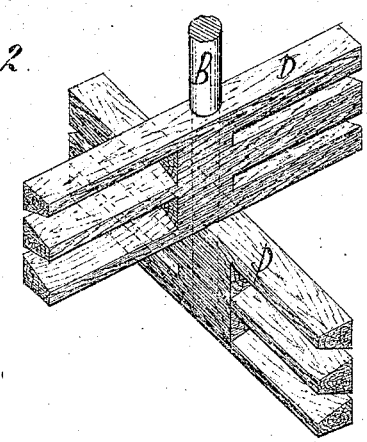

In the drawing, Figure 1 is a vertical section through my churn. Fig. 2 is a detached view of a double dasher.

My invention belongs to that class of churns known as box-churns; and consists of a peculiar and novel construction and arrangement of dasher.

In my churn the box A may be of any suitable size. The shaft B has a step, C, in the bottom of the box, and is provided with a peculiar dasher or beater, D, which is simple in form, having a series of fingers and slots. These fingers are made with one side broad and the other narrow, so as to give a different stroke upon the cream according to the direction in which the fingers are revolved. In Fig. 1 a single beater is shown with two set of fingers, and in Fig. 2 are seen two beaters or four sets of fingers in the form of a cross. When the single beater is rotated in one direction the sharp or narrow edges of the fingers strike the cream, and when the motion is reversed the broad faces of the fingers strike the cream. But when the cross-beater, Fig. 2, is used the upper set of fingers gives a different stroke from the lower. When rotated in one direction the upper fingers strike the cream with the flat sides and the lower fingers with the narrow edges, and when the motion is reversed the upper fingers strike with the narrow edges and the lower with the broad faces, and as the four sets of fingers follow each other in circuit each alternate set of fingers (passing a given point in succession) will give a change of stroke upon the cream. The top of the shaft B carries a pinion, E, which gears into the wheel F, upon the crank-shaft G, to give motion to the beaters or dasher. A crank, H, may be employed, or other means, to give motion to the churn. As the beater or dasher is revolved the cream is driven against the sides of the box and thus receives a double action. As the butter comes it is collected around the shaft and dasher in the middle of the churn.

I do not broadly claim a box-churn with a vertical shaft, but I believe the above-described dasher and also the combination above described are new.

Having described my invention, I claim—

The above-described dasher, provided with the series of fingers having broad faces on one side and narrow edges on the other for giving two different strokes to the cream, substantially as set forth.

HENRY MULHOLLAND.

Witnesses:
DANIEL BREED,
EDM. F. BROWN.